Figure 1:
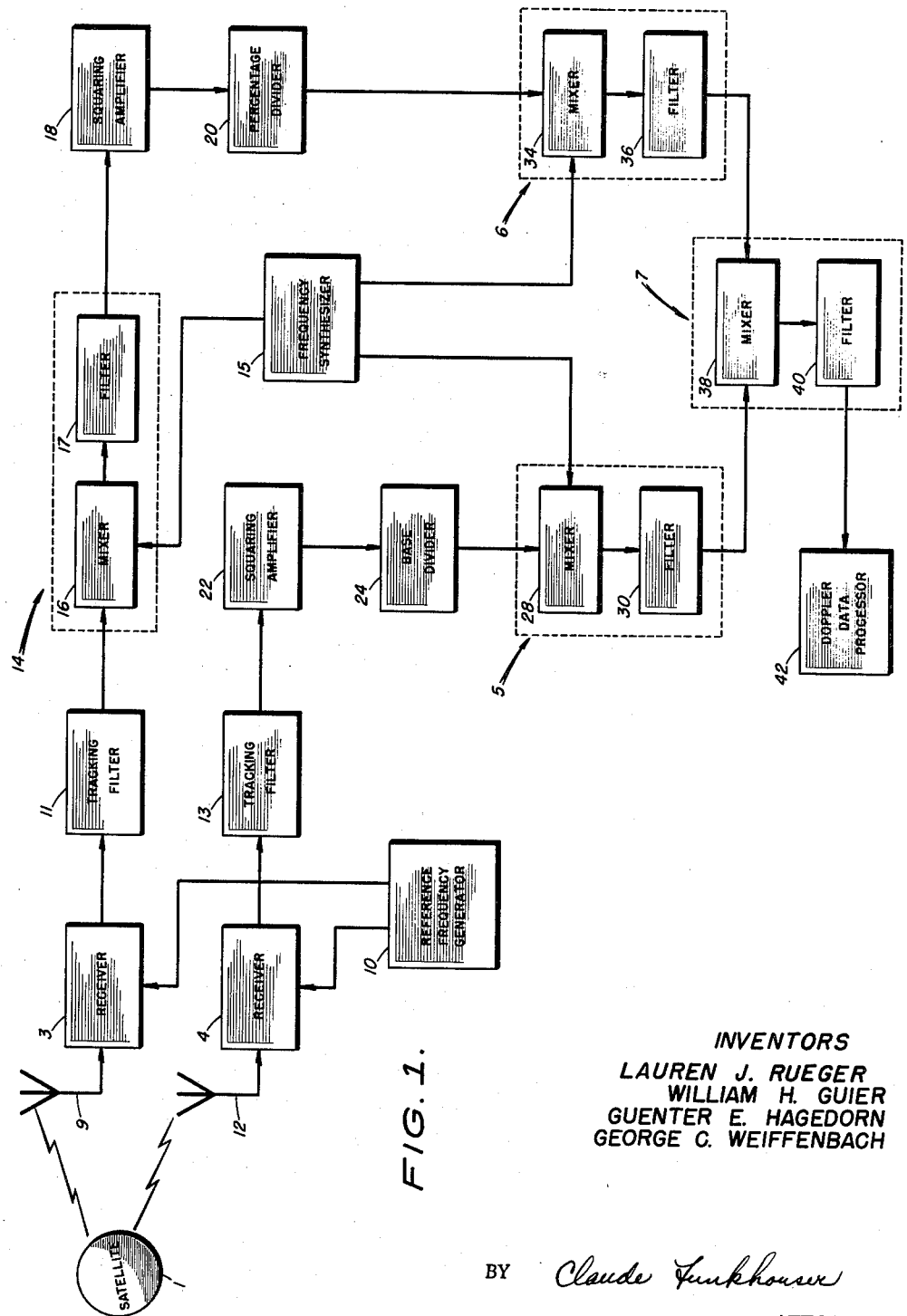

March 10, 1964 G. E. HAGEDORN ETAL 3,124,799
IONOSPHERIC REFRACTION CORRECTION SYSTEM
Filed July 5, 1962 3 Sheets-Sheet 1

INVENTORS
LAUREN J. RUEGER
WILLIAM H. GUIER
GUENTER E. HAGEDORN
GEORGE C. WEIFFENBACH

BY Claude Funkhouser
ATTORNEY

INVENTORS
LAUREN J. RUEGER
WILLIAM H. GUIER
GUENTER E. HAGEDORN
GEORGE C. WEIFFENBACH

BY Claude Funkhouser
ATTORNEY

March 10, 1964   G. E. HAGEDORN ETAL   3,124,799
IONOSPHERIC REFRACTION CORRECTION SYSTEM
Filed July 5, 1962   3 Sheets-Sheet 3

INVENTORS
LAUREN J. RUEGER
WILLIAM H. GUIER
GUENTER E. HAGEDORN
GEORGE C. WEIFFENBACH

BY Claude Funkhouser
ATTORNEY

United States Patent Office 3,124,799
Patented Mar. 10, 1964

3,124,799
IONOSPHERIC REFRACTION CORRECTION
SYSTEM
Guenter E. Hagedorn, Washington, D.C., William H. Guier, Silver Spring, Md., George C. Weiffenbach, Washington, D.C., and Lauren J. Rueger, Silver Spring, Md., assignors to the United States of America as represented by the Secretary of the Navy
Filed July 5, 1962, Ser. No. 207,828
14 Claims. (Cl. 343—100)

This invention relates to ionspheric refraction correction systems and, more particularly, to an ionspheric refraction correction system for use in a satellite Doppler navigation system.

A Doppler navigation system is described by Frank T. McClure in his application dated May 12, 1958, Serial No. 736,435. A major source of error in such satellite Doppler tracking systems is ionospheric refraction. For purposes of studying its effect upon the Doppler shift, the ionosphere can be replaced by an equivalent index of refraction. Since the Doppler shift of a signal emanating from a satellite is basically the time rate of change of its electromagnetic path length, it is altered from what it would be in the absence of the ionosphere.

The navigational error produced by ionspheric refraction can be understood quantitatively by noting that the maximum slope of the Doppler curve is a rough measure of the slant range, and that refraction has a direct effect on this slope. Since the effect of refraction is to decrease the slope, the refraction error will be such as to place the observer further from his actual location, as measured from the satellite, than would be true if the ionsphere had not effect upon the transmitted signals. For example, it has been found that for a ground range of 500 nautical miles and a transmitter frequency of 200 megacycles per second, the navigational error is approximately two nautical miles. Furthermore, the best attainable fit of the refracted Doppler curve by an unrefracted theoretical Doppler curve is about two cycles per second R.M.S., as opposed to a fit of about 0.2 cycle per second R.M.S. when the refraction contribution was not included.

Studies on the effects of refraction indicate that the refraction contribution cannot be ignored for transmitter frequencies up to about 500 megacycles per second. Furthermore, the degree to which the electron distribution in the ionosphere can be predicted, so as to make a previous correction for refraction, indicates that such predictions are not sufficiently reliable to reduce the refraction-created errors dependably below one half mile. Since it is not advisable to use transmitter frequencies greater than about 500 megacycles per second for a navigational system, the present system was devised to eliminate the effects of this ionospheric effect by the use of two transmitter frequencies, and to thereby take advantage of the dispersive effect of the ionosphere.

One object of the present invention, therefore, resides in the provision of a novel arrangement for providing ionospheric refraction correction in a satellite Doppler navigation system.

Another object of the invention is to provide a novel arrangement for providing ionospheric refraction correction through the use of various pairs of transmitted frequencies harmonically related.

A further object of the invention is to provide a corrected Doppler frequency and the first order ionospheric refraction term simultaneously.

Figure 2:
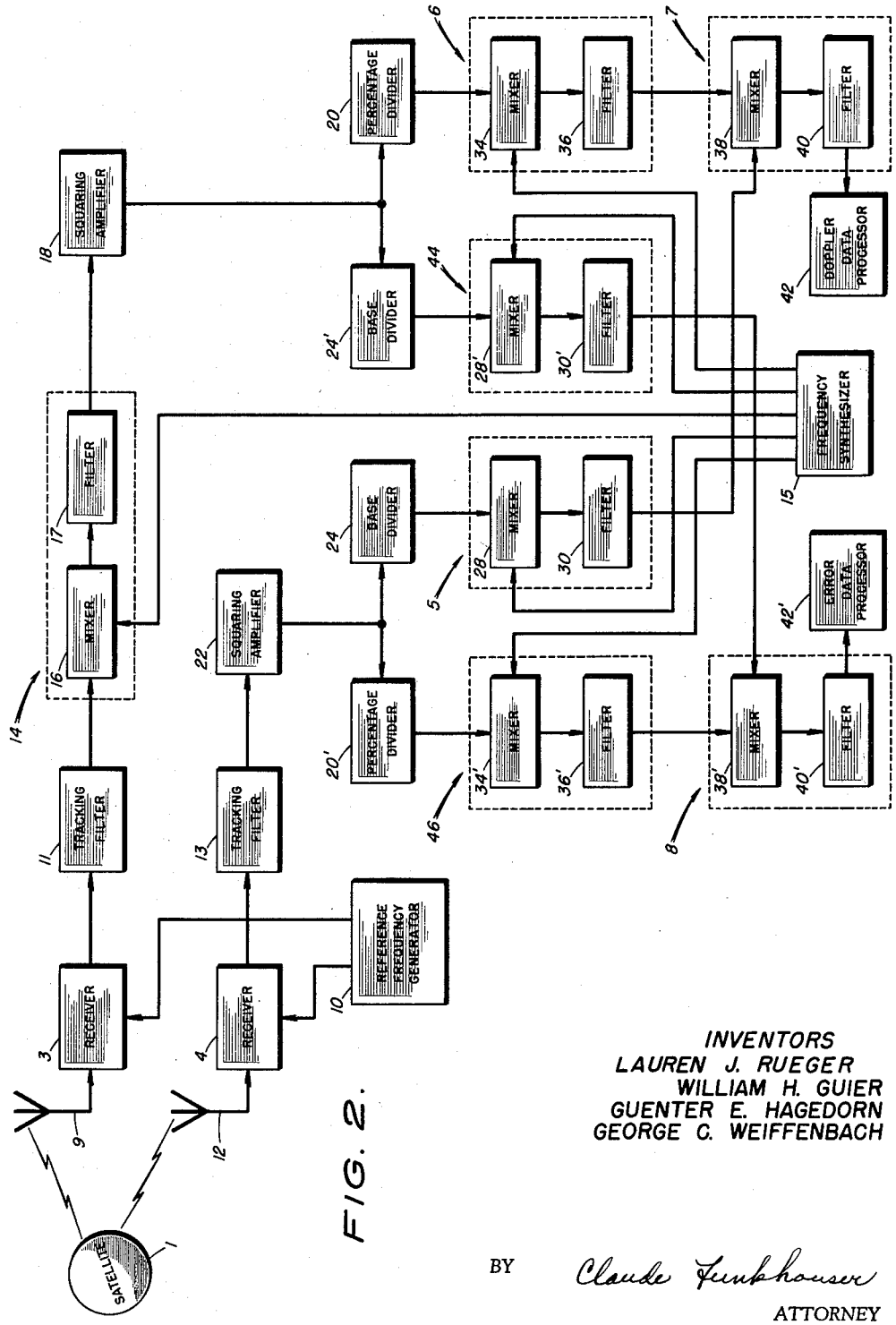
Figure 3:
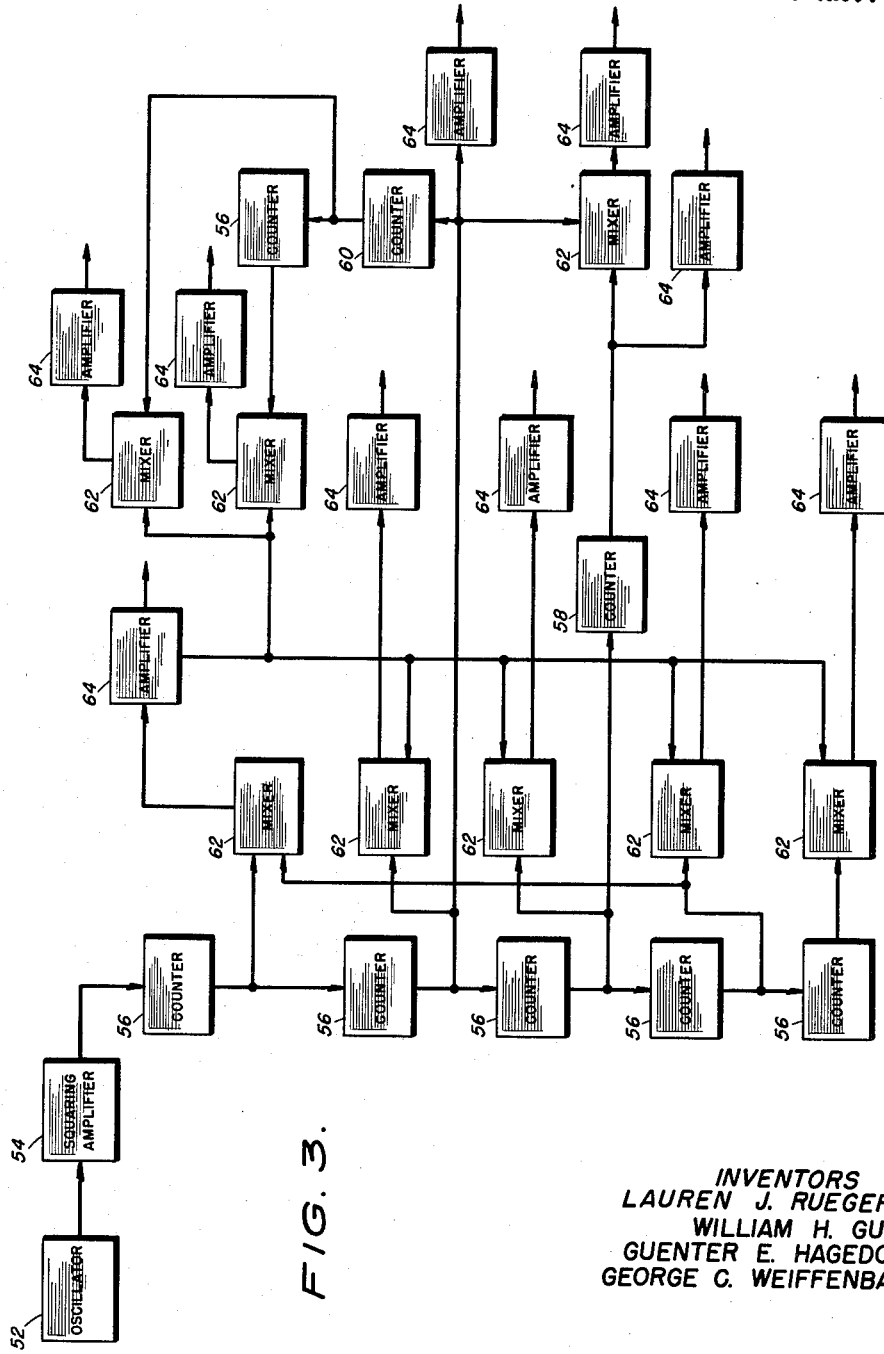

Other objects and many of the attendant advantages of the present invention will be readily appreciated as the same becomes better understood by reference to the following detailed description when considered in connection with the accompanying drawings, wherein:

FIG. 1 is a block diagram of the ionospheric refraction correction system;
FIG. 2 is a more detailed block diagram of the ionospheric refraction correction system; and
FIG. 3 is a block diagram of the frequency synthesizer employed in the invention.

Briefly, this invention consists of a refraction corrector and a frequency synthesizer. The refraction corrector performs the mathematical operations necessary for evaluation of the corrected or "vacuum" Doppler and the first order refraction terms, whereas the frequency synthesizer produces the various injection frequencies required by the corrector and the tracking filters contained therein. By "vacuum" Doppler is meant a transmitted signal unaltered by ionospheric refraction.

The refraction corrector consists of a divider and a subtracter. A divider is utilized to lower the rate of operational frequencies as well as to perform the arithmetic process. This corrector will provide its two outputs, consisting of the corrected Doppler frequency and the error frequency, for any two carrier signals that have been subjected to ionospheric effects and which are harmonically related and derived from the same oscillator. For the purpose of the following discussion, a percentage frequency of 150 megacycles and a base frequency of 400 megacycles have been selected.

The divider in the refraction corrector consists of identical circuitry for two channels. The first channel operates with the lower transmitted frequency and the second channel operates with the higher transmitted frequency. In each channel the incoming signals are divided separately by both the base and percentage number such that in a later subtraction of the appropriately combined signals, both the "vacuum" Doppler term and the first order refraction term of the carrier of lower frequency are separately obtained.

The equipment has been specifically designed to operate with Interstate Electronics tracking filters model IV and model VIII. That is, the system is capable of operating on Doppler signals superimposed on 25 kilocycle or 250 kilocycle carriers.

Channels I and II are independent of each other, so that one channel may operate with a model IV tracking filter and the other with a model VIII tracking filter. The operating range for signals on a 25 kilocycle carrier is 20 kc. and, the operating range for signals on a 250 kilocycle is 35 kc.

The refraction corrector automatically performs the solution of two simultaneous equations having two unknowns. This mathematical procedure is well-known and need not be independently discussed.

Referring to FIG. 1, there may be seen a block diagram of the invention, wherein 1 represents an orbiting satellite having a pair of transmitters therein which transmit on frequencies of approximately 150 and 400 megacycles. The two transmitter frequencies emanating from the satellite 1 are harmonically related, and are derived from the same oscillator. Each transmitted frequency has a minus frequency offset from its nominal frequency, and the offset is proportionately larger for the higher frequency. This offset is desirable when it is noted that a radio transmission from a satellite approaching an earthbound observer has an increase in frequency due to the Doppler effect and the radio transmission from a satellite receding from an earthbound observer has a decrease in frequency for the same reason. However, the avoidance of a possible ambiguity of a received signal passing through a zero beat frequency, while making a complete overhead pass, is accomplished by offsetting the transmitted frequency from the locally generated beat frequency by a sufficient deviation so that a zero beat never occurs.

The transmitted frequency received by receivers 3 and 4 is a complex frequency having a composite variable component and a carrier frequency. The carrier frequency is the original frequency generated in the satellite and transmitted therefrom. For purposes of clarity in the following discussion this frequency is made equal to the locally generated frequency and the value of the offset is grouped in the composite component. This composite component further includes a frequency component attributable to the Doppler change, and an error frequency component attributable to the refractive effect of the ionosphere. Throughout the following discussion, the composite frequency will be first superimposed on a variety of different carrier frequencies which are required by the choice of electronic components in the circuit. When the composite frequency is superimposed on a carrier frequency, it will be known as a combined frequency. Subsequently, the combined frequencies of each channel are mixed in a pair of intermediate frequency error subtracters 5 and 6 and superimposed upon an intermediate carrier frequency. In a later subtraction operation in an error frequency subtracter 7 the error frequency term attributable to the refractive effect of the ionosphere will be removed. Thereafter, the actual Doppler frequency component will be available by making successive frequency measurements. Additionally, by a separate operation shown in FIG. 2, again using the invention, the two composite frequencies will be simultaneously combined in similar but separate division and subtraction processes, whereby the frequency component attributable to the Doppler frequency will be removed in a Doppler frequency subtracter 8 and the actual error frequency will be available.

The receiver 3 has two input signals, one of which is the transmitted combined frequency picked up by an antenna 9, the other is the nominal frequency of 150 megacycles generated in a reference frequency generator 10. The reference frequency generator consists of a suitable stable oscillator such as Model 103 AR manufactured by Hewlett Packard Company and having sufficient frequency multipliers associated therewith to substantially equal the transmitted frequency.

The output frequency from the receiver 3 is a composite frequency of the lower transmitted frequency. This composite frequency is separated from the transmitted signal in the receiver 3 and tracked in a tracking filter 11 which additionally superimposes the composite frequency on a 25 kc. signal from a frequency synthesizer, to be described hereinafter. A suitable tracking filter is that identified as model IV, manufactured by Interstate Electronics Company.

The receiver 4 has two input signals, one of which is the combined transmitted 400 megacycle frequency received by an antenna 12 and the other the locally generated 400 megacycle signal from the reference frequency generator 10. The output from the receiver 4 is the higher composite frequency. This composite frequency is tracked in a tracking filter 13 and superimposed upon a 250 kc. carrier signal from the aforementioned frequency synthesizer. A suitable tracking filter is that identified as model VIII, manufactured by Interstate Electronics Company. The model VIII tracking filter must be utilized for this channel because of the Doppler bandwidth requirements for the higher transmitted frequency.

It is now obvious that the carrier frequencies in the tracking filters 11 and 13 differ by 225 kc. It is necessary for the simplified operation of the equipment that the carrier frequencies be the same. The lower carrier frequency is increased to equal the higher carrier frequency in a summing network 14.

The summing network 14 has two input signals, one of which is the composite frequency superimposed upon a 25 kc. carrier from the tracking filter 11, and the other is a 225 kc. locally generated frequency from a frequency synthesizer 15. The two frequencies are mixed in a balanced mixer 16 and the frequency equal to the sum is extracted in a band pass filter 17. The pass band of the filter 17 is equal to the expected total Doppler variation and for the lower frequency may be 10 kc.

The output carrier frequency from the summing network 14 is now equal to the carrier frequency from the tracking filter 13. The combined frequency from the summing network 14 is applied to a squaring amplifier 18 and is changed into a square wave for later application to a percentage divider circuit 20.

The output from the tracking filter 13 is applied to a squaring amplifier 22 and is changed into a square wave for application to a base divider circuit 24. The output frequency from the squaring amplifiers 18 and 22 consists of a composite frequency attributable to both of the transmitted frequencies superimposed on a 250 kc. carrier.

The higher combined frequency applied to the "base" divider 24 is divided by a factor of 8 in binary counting circuits well-known in the art. A suitable binary counting circuit is constructed of binary modules identified as type T–303 and T–101 manufactured by Engineered Electronics Company. The output divided frequency is applied to a mixer 28 which is a part of the intermediate frequency Doppler subtracter 5. The mixer 28 has two input signals, one of which is from the base divider 24, and the other from the frequency synthesizer 15. The signal from the synthesizer 15 has such a value as to cancel the effect of the quotient frequency from the divider 24 attributable to its carrier frequency when mixed in the mixer 28 and applied to a band pass filter 30 designed to produce the difference frequency of the mixed signals. Additionally, this frequency from the synthesizer is selected to superimpose the remaining composite frequency component on an intermediate carrier frequency. An intermediate frequency of 437.5 kc. has been selected for this embodiment. However, this frequency is not critical but is dictated by the operating characteristics of the band pass filter 30.

The percentage divider circuit 20 is similar to the base divider 24 except that the applied frequency is divided by the percentage number of the ratio of the transmitted frequencies, the same being 3 for this embodiment of the invention. The output of the divider 20 is applied to a mixer 34 which is part of the other intermediate frequency Doppler subtracter 6. The mixer 34 has two input frequencies, one of which is from the divider 20, and the other from the frequency synthesizer 15. The frequency of the signal from the frequency synthesizer 15 has such a value as to cancel the effect of the quotient frequency attributable to the carrier frequency when mixed in the mixer 34 and applied to a band pass filter 36, designed to extract the difference frequency of the mixed signals. Additionally, this frequency from the synthesizer is selected to superimpose the remaining composite frequency on an intermediate carrier frequency of 437.5 kc.

A mixer 38 has two input signals, one of which is the divided lower composite frequency superimposed upon the intermediate frequency from the filter 36, and the other is the divided higher composite frequency superimposed upon the intermediate frequency from the filter 30. The two error terms attributable to the refractive effect of the ionosphere are cancelled when the two composite frequencies are mixed, and a low pass filter 40 only passes the difference frequencies in the range of the Doppler difference in the composite frequencies. The output frequency from the filter 40 is directly proportional to the lower corrected "vacuum" Doppler frequency by a constant of $55/72$.

A stable oscillator is used in the orbiting satellite 1, so the offset term of both composite frequencies should remain unchanged during one over-head pass. Therefore, the output frequency will only change as its Doppler term changes. Successive measurements over short increments of time, such as one second, will be performed by an associated Doppler data processor 42. The Doppler data processor will not be discussed herein because it is beyond the scope of the instant invention.

Referring to FIG. 2, there can be seen an embodiment of the invention as discussed in FIG. 1, but which additionally includes circuitry to provide the actual error frequency output. The circuits previously described will be given the same numbers and will not be described again. Additionally, the added circuits similar to those in FIG. 1 will be given the same number but primed.

The Doppler frequency component of the composite frequency will be cancelled in a way similar to the way in which the error frequency component was cancelled. The divided frequency in the low frequency channel will be mixed in a low frequency Doppler subtracter 44, and the divided frequency in the high frequency channel will be mixed in a high frequency Doppler subtracter 46. Both composite frequencies will be superimposed upon an intermediate carrier frequency. In a later subtraction operation in the Doppler frequency subtracter 8, the Doppler frequency terms and the offset terms will be cancelled, leaving only the error frequency term. The output from the filter 40' is directly proportional to the actual lower error frequency by a constant of $55/192$. This frequency can be recorded by an error data processor 42' which consists of a Strip Chart Recorder model 152–100B, manufactured by the Sanborn Corporation.

Referring to FIG. 3, there may be seen a block diagram of the frequency synthesizer 14, wherein a one megacycle oscillator 52 is used as the frequency standard. The output from the oscillator is squared in a squaring amplifier 54 and is applied to the first of a series of binary counters 56 which divides its input by a factor of two. A counter 58 divides by a factor of five and a counter 60 divides by a factor of three. A plurality of balanced mixers is seen at 62. A tuned amplifier 64 is associated with each balanced mixer and is used to extract the difference frequency from the two applied frequencies.

In operation this invention is capable of working with any pair of frequencies which are harmonically related. Only slight changes need be made in the equipment in order to prepare it to operate with a new pair of frequencies. If the transmitted frequency is lower than 300 megacycles, a model IV tracking filter can be used for that channel. However, when a model IV tracking filter is utilized, a summing network 14 must be used to raise the carrier frequency to 250 kc. providing simplified operation throughout the remaining portion of the equipment. The frequency selected from the frequency synthesizer 15 for mixing in mixers 28 and 34 must be changed for different transmitted carrier frequencies.

Although the invention has been described as a first order ionospheric refraction correction system, it is to be understood that higher orders of correction can be obtained by duplicating the apparatus for additional channels.

Obviously, many modifications and variations of the present invention are possible in the light of the above teachings. It is therefore to be understood that within the scope of the appended claims the invention may be practiced otherwise than as specifically described.

What is claimed is:

1. In an ionospheric refraction correction system for an orbiting satellite wherein a pair of continuous wave signals are transmitted from said satellite in a predetermined ratio; a refraction corrector comprising, means for receiving the transmitted signals, means for extracting a pair of composite frequencies from each received signal, means to divide one of said composite frequencies by the base of the ratio of the transmitted frequencies, means to divide the other of said composite frequencies by the percentage of the ratio of the transmitted frequencies, each of said composite frequencies including a frequency component attributable to Doppler change and an error frequency component attributable to the refractive effect of the ionosphere, and means to subtract one quotient frequency from the other quotient frequency to cancel the error frequency attributable to the refractive effect of the ionosphere.

2. A refraction corrector according to claim 1, wherein the extracting means includes summing means for superimposing the composite frequencies upon equivalent carrier frequencies.

3. A refraction corrector according to claim 1, wherein the dividing means includes means for generating a plurality of beat frequencies.

4. A refraction corrector according to claim 3, wherein the dividing means includes mixing means for producing the composite frequencies superimposed upon intermediate carrier frequencies.

5. In an ionospheric refraction correction system for an orbiting satellite wherein a pair of continuous wave signals are transmitted from said satellite in a predetermined ratio; a refraction corrector comprising, first receiving means adapted to receive the first of said signals, second receiving means adapted to receive the second of said signals, first filter means responsive to said first receiving means to extract a first composite frequency from the received frequency, second filter means responsive to said second receiving means to extract a second composite frequency from the received frequency, each of said composite frequencies including a frequency component attributable to Doppler change and an error frequency component attributable to the refractive effect of the ionosphere, first division means responsive to said first filtering means to divide the first composite frequency by the percentage number of the ratio of the transmitted frequencies, second division means responsive to said second filtering means to divide the second composite frequency by the base number of the ratio of the transmitted frequencies, means to generate a plurality of beat frequencies, first subtracting means responsive to said first division means and said frequency generating means to extract a first divided composite frequency, second subtracting means responsive to said second division means and said frequency generating means to extract the second divided composite frequency, and a third subtracting means responsive to said first and said second subtracting means to cancel the error component of the composite frequency attributable to the refractive effect of the ionosphere and to extract the proportionately related unrefracted Doppler frequency.

6. An ionospheric refraction correction system according to claim 5, which further includes summing means responsive to the output of said first filter means to superimpose the first composite frequency on a carrier frequency.

7. A refraction corrector according to claim 5, wherein the subtracting means further includes filtering means to extract the difference frequencies.

8. A refraction corrector according to claim 5, wherein the first division means further includes third means to divide the combined frequency by the base of the ratio of the transmitted frequencies.

9. A refraction corrector according to claim 8 wherein the second division means further includes fourth means to divide the combined frequency by the percentage of the ratio of the transmitted frequencies.

10. A refraction corrector according to claim 9, which further includes a low frequency Doppler subtracter, a high frequency Doppler subtracter, and a Doppler frequency subtracter.

11. A refraction corrector according to claim 10, wherein said low frequency Doppler subtracter comprises mixing means responsive to said third dividing means and said beat frequency generator, and filtering means to extract the difference composite frequency superimposed upon an intermediate frequency.

12. A refraction corrector according to claim 10, wherein said Doppler frequency subtractor comprises mixing means responsive to said fourth dividing means and said beat frequency generator, and filtering means to extract the difference composite frequency superimposed upon an intermediate frequency.

13. A refraction corrector according to claim 10, wherein said Doppler frequency subtracter comprises, mixing means responsive to said low frequency Doppler subtracter and said high frequency Doppler subtracter, and filtering means to extract the frequency attributable to the refractive effect of the ionosphere on the transmitted signal.

14. In an ionospheric refraction correction system for an orbiting satellite wherein a pair of continuous wave signals are transmitted from said satellite in a predetermined ratio; a refraction corrector comprising, a relatively low frequency channel, a relatively high frequency channel, means to generate a plurality of beat frequencies, a radio receiver in each channel, means to separate received composite frequencies from the received signals, each of said composite frequencies including a frequency component attributable to Doppler change and an error frequency component attributable to the refractive effect of the ionosphere, means to divide the composite frequency in each channel by the percentage and by the base of the ratio of the transmitted frequencies, means to superimpose the composite frequency of each dividing means upon an intermediate frequency, means to subtract the percentage quotient frequency of one channel from the base quotient frequency of the other, filtering means to extract the proportionately related unrefracted frequency, and filtering means to extract the proportionately related error frequency.

References Cited in the file of this patent

Proceedings of the I.R.E., vol. 48, No. 4, April 1960, pp. 750–754.